United States Patent
O'Connor (10) Patent No.: US 8,366,131 B2
(45) Date of Patent: Feb. 5, 2013

(54) PIVOT JOINT FOR BICYCLE

(75) Inventor: D'Arcy O'Connor, Vancouver (CA)

(73) Assignee: Rocky Mountain Bicycles, a division of Procycle Group Inc., Saint-Georges de Beauce, Quebec (CA)

( * ) Notice: Subject to any disclaimer, the term of this patent is extended or adjusted under 35 U.S.C. 154(b) by 0 days.

(21) Appl. No.: 13/391,040

(22) PCT Filed: Aug. 4, 2010

(86) PCT No.: PCT/CA2010/001195
§ 371 (c)(1),
(2), (4) Date: Apr. 19, 2012

(87) PCT Pub. No.: WO2011/020173
PCT Pub. Date: Feb. 24, 2011

(65) Prior Publication Data
US 2012/0200062 A1     Aug. 9, 2012

Related U.S. Application Data

(60) Provisional application No. 61/235,149, filed on Aug. 19, 2009.

(51) Int. Cl.
B62K 19/30     (2006.01)
(52) U.S. Cl. .......................................... 280/284; 280/274
(58) Field of Classification Search .................. 280/284, 280/288, 281.1, 274
See application file for complete search history.

(56) References Cited

U.S. PATENT DOCUMENTS

| 5,217,241 A * | 6/1993 | Girvin ........................... 280/284 |
| 5,716,144 A | 2/1998 | Bickle et al. |
| 5,924,801 A | 7/1999 | Chi |
| 5,927,741 A * | 7/1999 | Chi ............................... 280/275 |

FOREIGN PATENT DOCUMENTS

| CN | 101590892 A | 2/2009 |
| WO | 2005030566 A1 | 4/2005 |

OTHER PUBLICATIONS

International Search Report for International Application No. PCT/CA2010/001195 mailed Feb. 24, 2011.

* cited by examiner

*Primary Examiner* — Tashiana Adams
(74) *Attorney, Agent, or Firm* — McDonnell Boehnen Hulbert & Berghoff LLP (57) ABSTRACT

A pivot joint for a bicycle frame is described, which includes an inner bearing sleeve concentrically disposed within an outer bearing sleeve. The inner bearing sleeve has an outer bearing surface in rotatably sliding contact with an inner bearing surface of the outer bearing sleeve, such that the inner and outer bearing sleeves are rotatable relative to each other about a central pivot axis to permit relative rotation of the components joined by the pivot joint. Each of the inner and outer bearing surfaces includes a substantially axially extending region and at least one angled bearing region that defines an angled raceway surface thereon. The angled raceway surfaces are disposed at an angle relative to the central pivot axis and meet in bearing engagement with each other to define a slip plane disposed at the same angle.

35 Claims, 5 Drawing Sheets

PIVOT JOINT FOR BICYCLE

CROSS-REFERENCE TO RELATED APPLICATIONS

The present application is a U.S. National Phase Application pursuant to 35 U.S.C. §371 of International Application No. PCT/CA2010/001195 filed Aug. 4, 2010, which claims priority to U.S. Provisional Patent Application No. 61/235,149, filed Aug. 19, 2009, the entire content of which is incorporated herein by reference.

TECHNICAL FIELD

The application relates generally relates to bicycles, more particularly to pivot joints used in bicycle frames.

BACKGROUND

Continuous improvements to bicycles are being sought in an attempt to maximize rider performance and comfort, increase durability of parts, reduce weight, etc. Bicycle weight can particularly affect rider performance and so limiting the weight of bicycle components is desirable. For this reason, bicycles components, such as suspensions, are constantly redesigned in order to comprise lighter components which nevertheless remain durable. Many existing mountain bicycle designs employ ball bearings at key pivot or rotating points, such as between pivoting suspension links for example. These may include replaceable cartridge ball bearings. While durable, such ball bearing cartridges are relatively heavy.

While the use of bearings having polymer bushings have been tried in an attempt to replace ball bearing cartridges with lighter pivot bearing materials, such known polymer bushing pivots have been found difficult to keep tight as they cannot be clamped tightly without deforming the polymer bushing and thus potentially negatively effecting the performance of the pivot bushing.

Accordingly, improvements in bicycle frame pivot joints are sought.

SUMMARY

In accordance with an aspect of the present disclosure, there is provided a pivot joint for providing relative rotation between two components of a bicycle, the pivot joint comprising an inner bearing sleeve concentrically disposed within an outer bearing sleeve, the inner bearing sleeve having an outer bearing surface in rotatably sliding contact with an inner bearing surface of the outer bearing sleeve such that the inner and outer bearing sleeves are rotatable relative to each other about a central pivot axis to permit relative rotation of the frame components joined by the pivot joint, and each of the inner and outer bearing surfaces having a substantially axially extending region and at least one angled bearing region defining an angled raceway surface thereon which is disposed at an angle relative to the central pivot axis, the angled raceway surfaces meeting in bearing engagement with each other to define a slip plane disposed at said angle.

There is also provided, in accordance with another aspect of the present disclosure, a bicycle frame comprising a rear wheel suspension and at least one pivot joint pivotally interconnecting first and second bicycle components such as to permit relative rotation therebetween, at least one of the first and second bicycle components being a portion of the bicycle frame, the pivot joint being a plain-bearing free of rolling elements comprising two concentric bearing shells, the bearing shells including inner and outer bearing sleeves which are rotateable one within the other about a central pivot axis and which include respective bearing surfaces in sliding contact with each other, the outer bearing sleeve being in fixed abutment with the first bicycle component and the inner bearing sleeve being in fixed abutment with the second bicycle component, the inner bearing sleeve having first and second angular contact bearing portions which define angled outer bearing surfaces thereon and the outer bearing sleeve having second and third angular bearing portions defining angled inner bearing surfaces thereon, said angled outer and inner bearing surfaces abutting each other in bearing engagement and being disposed at an common angle relative to the central pivot axis to define an angled slip plane therebetween.

This is further provided, in accordance with another aspect of the present disclosure, a bicycle comprising a front wheel, a frame including a rear wheel suspension assembly supporting a rear wheel, and at least one pivot joint which provides relative rotation between two components of the bicycle, the pivot joint having an inner bearing sleeve concentrically disposed within an outer bearing sleeve and being rotatable relative thereto about a central pivot axis to permit relative rotation of the two components joined by the pivot joint, the outer bearing sleeve being in fixed abutment with a first one of the two components and the inner bearing sleeve being in fixed abutment with a second one of the two components, the inner bearing sleeve having an outer bearing surface in sliding contact with an inner bearing surface of the outer bearing sleeve, each of the outer and inner bearing surfaces having a substantially axially extending region and at least one angled bearing region defining an angled raceway thereon which is disposed at an angle relative to the central pivot axis, the angled raceways meeting in bearing engagement with each other.

DESCRIPTION OF THE DRAWINGS

Reference is now made to the accompanying figures, in which.

DETAILED DESCRIPTION

Figure 1:
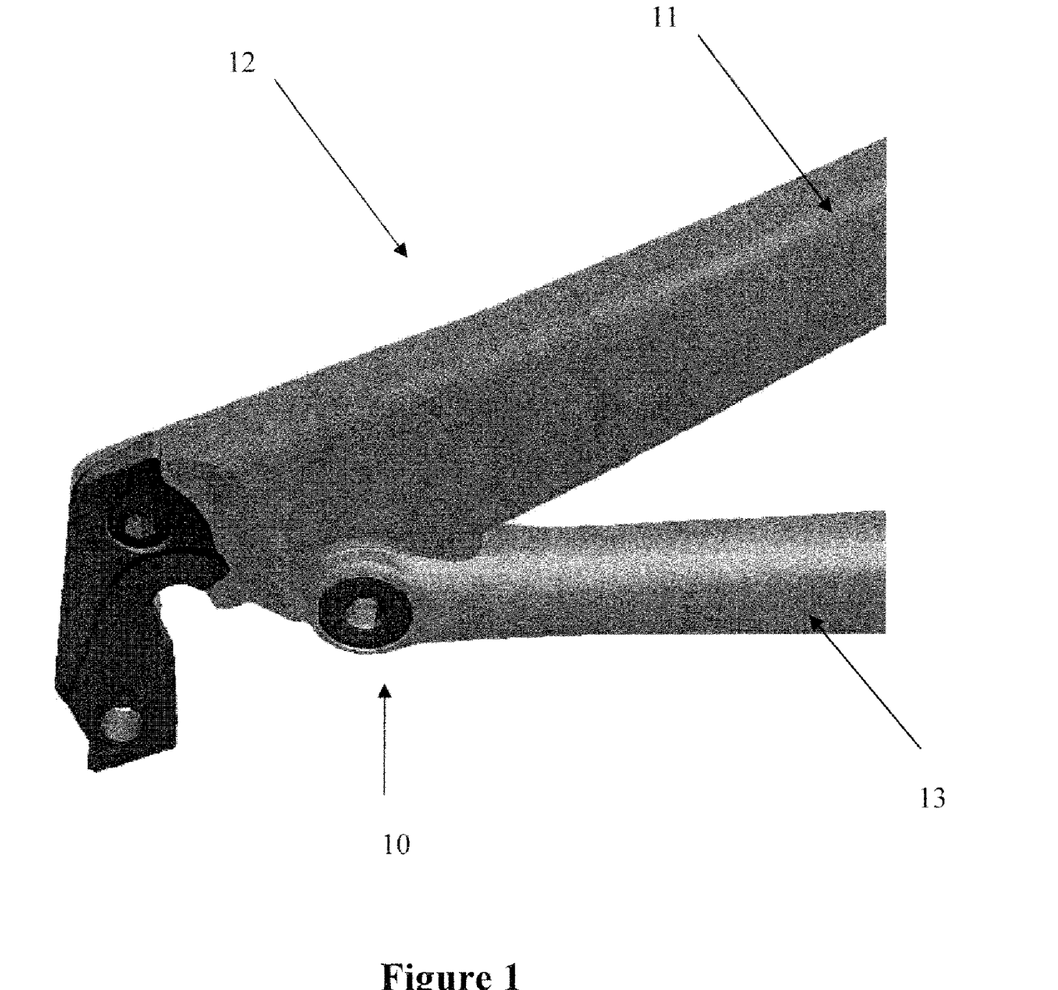
FIG. 1 is a partial perspective view of suspension components of a bicycle frame having a pivot joint therebetween.

FIG. 1 shows an embodiment of the present pivot joint 10 used in a bicycle frame 12 at a pivoting junction between two links in the suspension of the bicycle frame 12. In the depicted embodiment, the pivot joint 10 is disposed between a seatstay 11 and a chainstay 13 of the rear suspension portion of the bicycle frame 12, which are desired to pivot or rotate relative to each other. However, it is to be understood that the presently described pivot 10 can be employed at any pivot point of the bicycle frame, as well as between two relatively pivoting components of other two-wheel vehicles, such as motorcycles.

Figure 2:
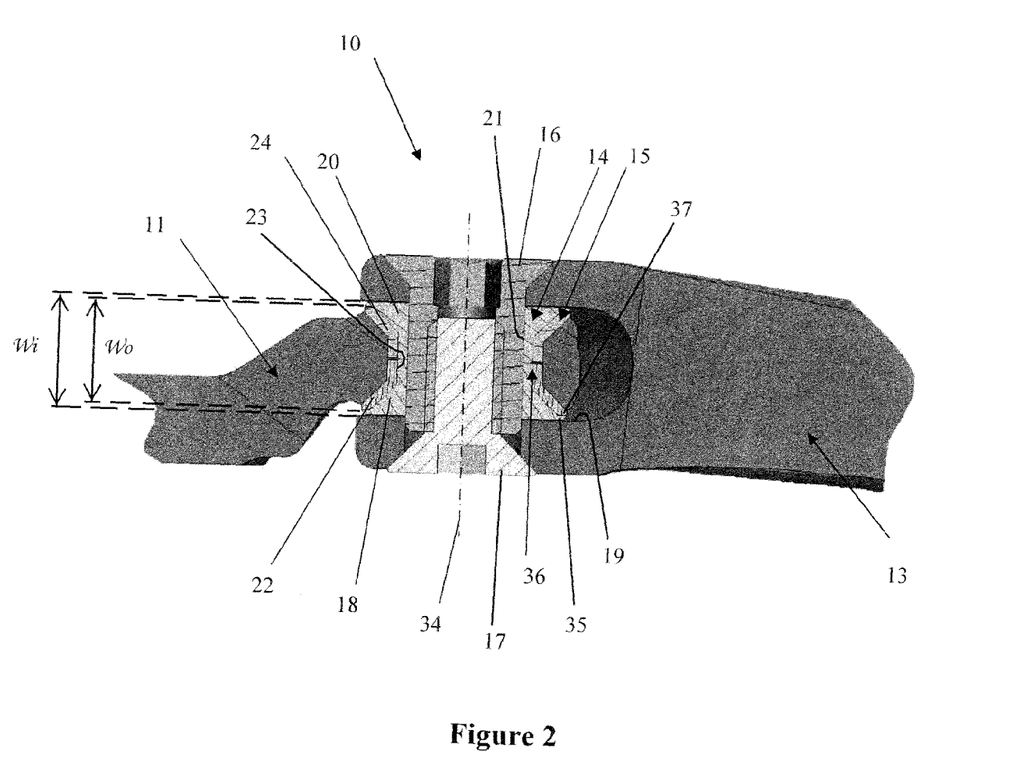
FIG. 2 is an axial cross-sectional view of a suspension pivot joint in accordance with an embodiment of the present disclosure.
Figure 3:
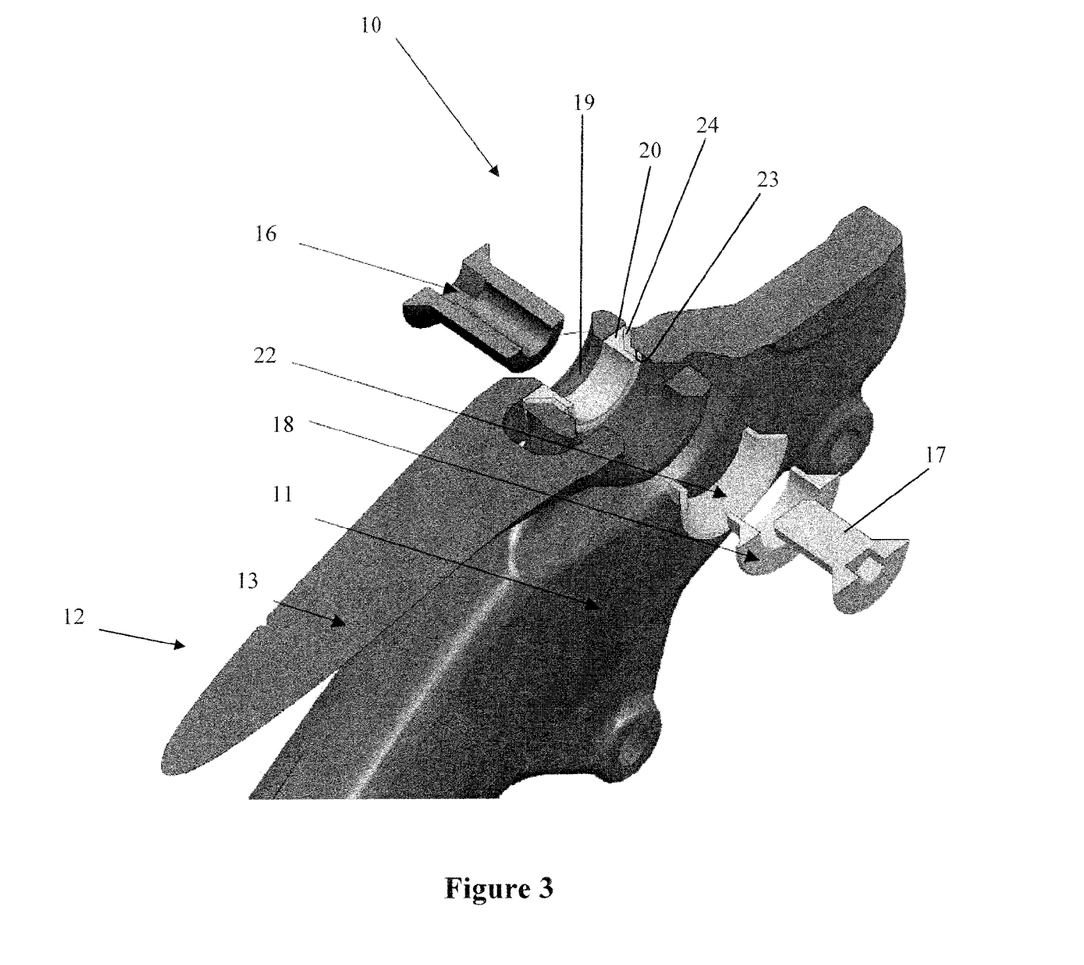
FIG. 3 is an exploded perspective, partially sectioned, view of the suspension pivot joint of FIG. 2.

As seen in FIGS. 2 and 3, the pivot 10 comprises concentric inner and outer bearing sleeves 14 and 15, respectively, which fit one within the other and permit relative rotational movement therebetween about a central pivot axis 34 extending transversely through the pivot 10. The pivot 10 is a two-piece plain bearing (i.e. free of rolling elements) wherein the concentric shells thereof are the inner and outer bearing sleeves 14,15 which are rotatable one within the other due to the respective bearing surfaces of each rotatably sliding one each other. The inner bearing sleeve 14 and the outer bearing sleeve 15 therefore act as inner and outer races of the non-rolling element bearing formed by the pivot 10, without requiring additional rolling elements as are typically used in ball bearings for example. As can be seen in FIG. 2, both the inner bearing sleeve 14 and the outer bearing sleeve 15 are annular and have a generally channel-shaped cross-sectional profile made up of a central portion, which is substantially parallel to the central axis 34, and opposed and transversely spaced apart angular portions.

As will be seen in further detail below, in the embodiment depicted in FIGS. 2-5, each of the inner bearing sleeve 14 and the outer bearing sleeve 15 are in fact made up of two halves which are transversely abutted together, end to end. For example, the inner bearing sleeve 14 includes a first angular contact bearing portion 18 and an opposite second angular contact bearing portion 20 which is a mirror image thereof. Similarly, the outer bearing sleeve 15 includes a first angular bearing portion 22 and an opposite angular bearing portion 24, which is a mirror image thereof. In the embodiment of FIG. 2, both the angular contact bearing portions 18 and 20 and the angular bearing portions 22 and 24 all meet at a common contact plane 36, which is substantially perpendicular to the central axis 34 and disposed at a transversely central midpoint through the pivot joint 10. However, as described in further detail below with reference to FIG. 6, in an alternate embodiment the inner bearing sleeve 114 is in fact comprised of a tubular component 130 which axially extends the full transversal width of the inner bearing sleeve 114 and a pair of opposed angular bearing portions 132 which define angled bearing surfaces 131 thereon which slide on the corresponding bearing surface(s) of the outer bearing sleeve.

Therefore, in one particular embodiment, the outer bearing sleeve 15 (made up of the abutted angular bearing portions 22 and 24) is formed of an elastomeric material (such as a polymer material for example) and therefore may be at least partially resilient, while the inner bearing sleeve 14 (made up of the abutted angular bearing portions 18 and 20) is formed of a metal alloy material. In this particular embodiment, therefore, the inner bearing sleeve 14 has a hardness and/or rigidity that is greater than that of the outer bearing sleeve 15. However, in an alternate embodiment the outer bearing sleeve 15 (and thus the angular bearing portions 22 and 24 thereof) is also made of a metal alloy material. Accordingly, the present pivot 10 need not necessarily include an elastomeric (ex: polymer) portion. Both the inner and outer bearing sleeves 14,15 may therefore be made up of the same or different materials. In a further alternate embodiment, for example, one and/or both of the inner and outer bearing sleeves 14 and 15 may be made of an elastomeric material such as a polymer, a plastic, a coated metal, ceramic, a metallic alloy, or any combination thereof.

Regardless of material chosen, however, the inner and outer bearing sleeves 14,15 are rotatable relative to, and within, each other such as to provide a friction reducing pivot bearing element which allows the components joined together by the pivot 10, such as the seat stay 11 and the chain stay 13 to pivot and/or rotate relative to each other with reduced friction without sacrificing stability or durability of the joint, and without causing eccentricities or other misalignments between these pivoting components.

When assembled as shown in FIG. 2, the inner bearing sleeve 14 and the outer bearing sleeve 15 are retained together within the pivoting joint by transversely extending and mating bolts 16 and 17, which are threadably engaged such as to transversely clamp the inner and outer bearing sleeves 14,15 in place between the two pivoting members of the bicycle frame.

Figure 4:
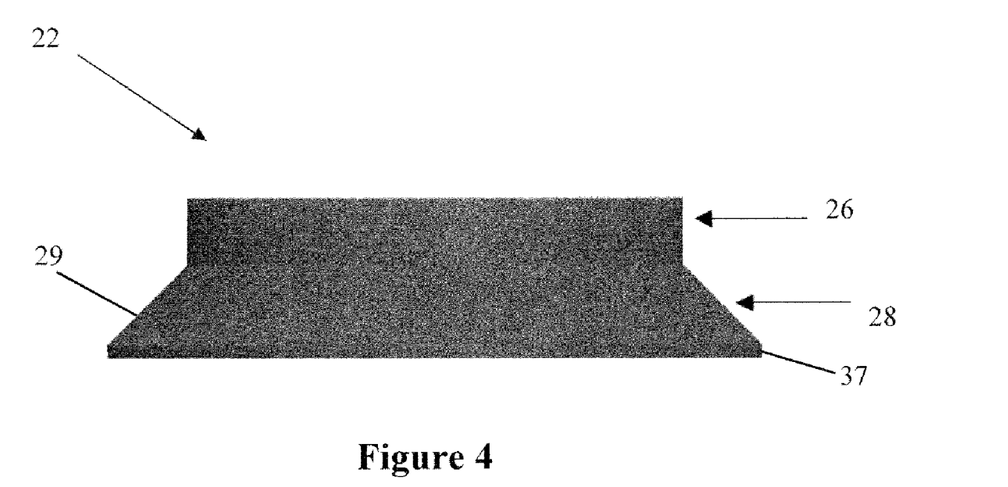
FIG. 4 is a plan view of an angular outer angular bearing portion of the pivot joint of FIG. 2.
Figure 5:
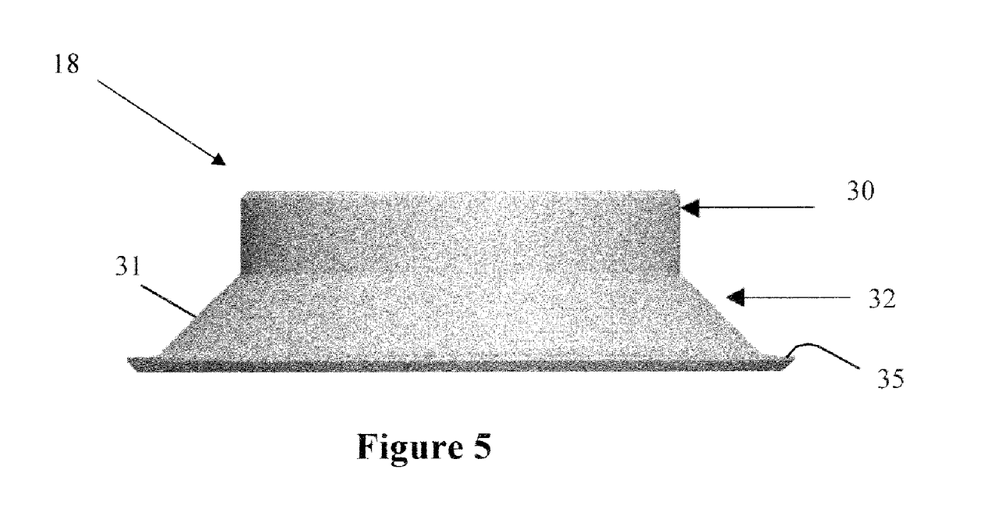
FIG. 5 is a plan view of the angular contact bearing portion of the pivot joint of FIG. 2.

However, the structure of the pivot 10 is such that regardless of the amount of torque applied to these bolts 16, 17 in order to tighten the pivot joint 10 between the two rotating components 11,13 of the bicycle frame 12, the inner and outer bearing sleeves 14 and 15 will not be unduly compressed, even when the outer bearing sleeve 15 is made of a deformable, resilient and/or flexible material (such as a polymer, for example). This is at least partially due to the fact that one of the two bearing sleeves can be load bearing (i.e. provides a major portion of the transverse load path therethrough) while the other of the two bearing sleeves is not substantially transversely loaded. In the present embodiment, for example, the inner bearing sleeve 14, which is comprised of an alloy or other substantially rigid material, has a greater width in the transversal direction (i.e. parallel to the central axis 34) than does the slightly narrower outer race 15. This can be seen in FIG. 2, wherein the total transversal width Wi of the inner bearing sleeve 14 is greater than the total transversal width Wo of the outer bearing sleeve 15. Additionally, as best seen in FIGS. 2 and 4-5, the angular bearing portions 18 and 20 of the inner bearing sleeve 14 have a radially projecting outer lip 35 which extends circumferentially about the full perimeter of the annular angular bearing portions 18,20. This radially projecting outer lip 35 extends radially beyond the outer circumferential perimeter 37 of the angular bearing portions 22 and 24 of the outer bearing sleeve 15, such that the outer bearing sleeve is not in contact with the walls of the frame component opening 19.

This configuration of the pivot 10 is therefore such that torquing down the bolts 16, 17 will simply cause the two halves 18 and 20 of the inner bearing sleeve 14 to be forced into tighter end-to-end abutting contact with each other at the contact surface plane 36, without crushing the narrower outer bearing sleeve 15. In the present embodiment wherein the outer bearing sleeve is comprised at least partially of a polymer material, the pivot 10 is thus able to adequately absorb any angular misalignment between the two rotating components of the bicycle frame or any vibration induced eccentricities, while still remaining securely and tightly clamped in place between the two rotating frame components by the bolts 16,17.

As seen in FIG. 2, the first and second angular contact bearing portions 18 and 20, which form the inner bearing sleeve 14, are located inside an opening 19 formed in one of the rotating frame components 13 (in this case a chain stay) of the frame 12. The bolt 16 passes through a central bore 21 in the two angular contact bearing portions 18, 20 and is in a tight or press fit engagement therewith, such that no relative rotation between the inner bearing sleeve 14 and the bolt 16 is possible. Similarly, the first and second angular bearing portions 22, 24 of the outer bearing sleeve 15 are in tight or press fit engagement within a bore 23 in the second of the two rotating frame components 11 (in this case a seat stay) of the frame 12. The first angular contact bearing portion 18 of the inner bearing sleeve 14 is thus in bearing engagement with the angular bearing portion 22 of the outer bearing sleeve, so as to allow relative movement of one with the other. Similarly, the opposite angular contact bearing portion 20 of the inner bearing sleeve 14, which is located opposite the angular contact bearing portion 18 with which it is abutted along the annular intersection 36, is in bearing engagement with the angular bearing portion 24 of the outer sleeve 15.

As best seen in FIG. 4, the angular bearing portion 22 of the outer bearing sleeve 15 comprises a bearing surface which includes a flat sleeve region 26 which is tubular and extends axially substantially parallel to the central axis, and an angled region 28 which includes an annular and angular bearing raceway surface 29 which extends from the flat sleeve region 26 at an angle relative thereto which may be 45 degrees from the axial and radial planes of the sleeve region 26, although other angles may alternately be used.

As best seen in FIG. 5, the angular contact bearing portion 18 of the inner bearing sleeve 14 comprises an inner ring spacer region 30, which is tubular and extends axially substantially parallel to the central axis, and an angled bearing raceway region 32 which defines an angled raceway surface 31 thereon that extends from the inner ring spacer region 30 at an angle corresponding to that of the angular bearing raceway surface 29 on the angled region 28 of the bearing portion 22, which, in this embodiment, is 45 degrees from the axial and radial planes of the inner ring spacer 30. The angled bearing surface 29 and the correspondingly angled bearing raceway surface 31 of the two mating portions of the inner and outer bearing sleeves but each other and are rotatably slideable relative to each other to form rotating inner and outer races of the pivot 10. The bearing surface 29 and the raceway surface 31 therefore meet along an angled and annular (ex: conical) slip plane.

The flat sleeve region 26 of the angular bearing portion 22 of the outer bearing sleeve 15 is press fit into the bicycle frame 12, thereby preventing the angular bearing portion 22 from freely rotating as the pivot 10 rotates. This prevents uneven bearing surface wear, and so allows for a longer bearing life. The only slip surface on the angular bearing portion 22 is between the angular region 28 thereof and the corresponding angled raceway region 32 of the angular contact bearing portion 18 that in bearing engagement therewith. In addition, the angular region 28 of the angular bearing portion 22 prevents the angular bearing raceway region 32 of the angular contact bearing portion 18 from slipping or sliding out of concentricity with the central axis 34 of the pivot 10.

The inner ring spacer regions 30 of the two angular contact bearing portions 18 that make up the inner bearing sleeve 14 determine a maximum inner pivot width, which allows an assembler or user of the bicycle to torque the alloy bolt 16 to a given high torque value, for example 120 in-lbs, without risk of crushing the outer bearing sleeve 15 at such high pivot bolt torque values. This is particularly useful when the outer bearing sleeve 15 is made of a relatively compressible or deformable material, such as polymer.

As noted above above, the angular contact bearing portion 18 abuts the opposite (and mirror image) angular contact bearing portion 20 along an annular contact region 36 at the intersection plane between the two halves of the inner bearing sleeve 14. This construction permits a preload force applied to the inner bearing sleeve 14 to be controlled, and the selected preload force applied will only be a function of the dimensions and tolerances of the load bearing one of the two bearing sleeves (which in the presently described embodiment is the inner bearing sleeve 14).

Figure 6:
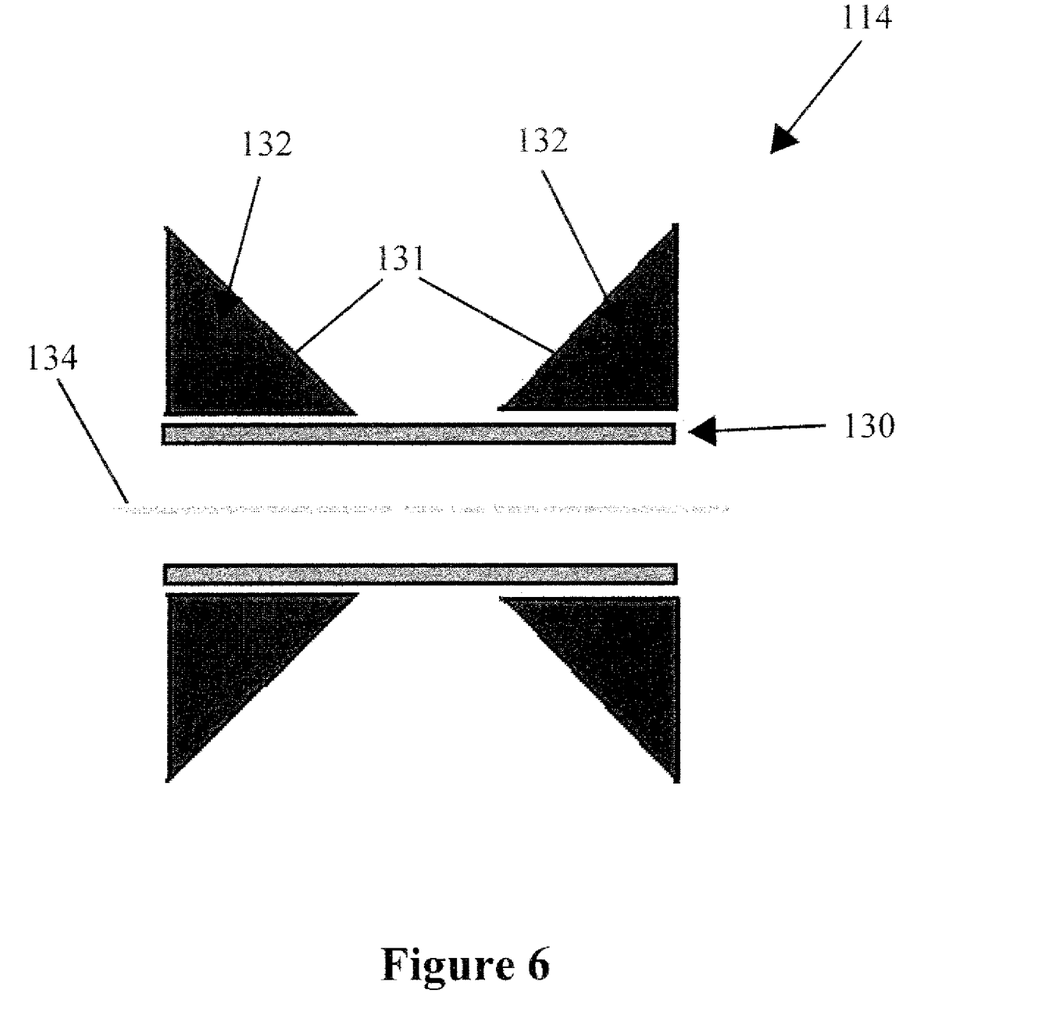
FIG. 6 is an axial cross-sectional schematic view of a pivot joint in accordance with an alternate embodiment of the present disclosure.

Referring now to FIG. 6, in accordance with an alternate embodiment the inner bearing sleeve 114 is comprised of a tubular component 130 which axially extends the full transversal width of the inner bearing sleeve 114 and a pair of opposed angular bearing portions 132 which define angled bearing surfaces 131 thereon which face towards each other and which are in sliding contact with the inner bearing surface of the outer bearing sleeve (not shown) such that the inner bearing sleeve 114 is rotatable about the central axis 134. Although the angular bearing portions 132 are depicted in FIG. 6 as being substantially triangular in cross-sectional shape, it is to be understood that these ring-shaped angular bearing portions 132 may also have alternate configurations as required to receive an end of one of the pivoting members of the bicycle frame therebetween. As per the pivot 10 described above, the components of the inner bearing sleeve 114, namely the tubular component 130 and the angular bearing portions 132, may be comprised of the same or different materials, which can include a polymer, a metallic alloy, a ceramic, a coated metal, and the like, provided that a substantially low-friction rotating contact exists between the bearing surfaces 131 of the inner bearing sleeve's two annular bearing portions 132 and the corresponding bearing surface(s) of the outer bearing sleeve 115.

Furthermore, a person skilled in the art will realize that the embodiment described herein is but one of many applications of this pivot design, which can be used in various other relatively pivoting components, both on a bicycle and elsewhere. For example, the present pivot design could also be applied to various other two-wheeled vehicles, such as in the suspension of a motorcycle for example. In addition, while the inner bearing sleeve 14 is described herein as being the laterally wider of the two bearing sleeves, it is to be understood that configuration of the inner and outer bearing sleeves can be reversed such that it is the outer bearing sleeve which is laterally wider and which therefore bears the bulk of the preload force and the torque applied when the bolt(s) of the pivot joint are tightened. The above description is meant to be exemplary only, and one skilled in the art will recognize that changes may be made to the embodiment described without departing from the scope of the invention disclosed.

The invention claimed is:

1. A pivot joint for providing relative rotation between two components of a bicycle, the pivot joint comprising an inner bearing sleeve concentrically disposed within an outer bearing sleeve, the inner bearing sleeve having an outer bearing surface in rotatably sliding contact with an inner bearing surface of the outer bearing sleeve such that the inner and outer bearing sleeves are rotatable relative to each other about a central pivot axis to permit relative rotation of the frame components joined by the pivot joint, and each of the inner and outer bearing surfaces having a substantially axially extending region and at least one angled bearing region defining an angled raceway surface thereon which is disposed at an angle relative to the central pivot axis, the angled raceway surfaces meeting in bearing engagement with each other to define a slip plane disposed at said angle.

2. The pivot joint as defined in claim 1, wherein each of the inner and outer bearing surfaces defines a pair of said angled raceway surfaces facing each other and disposed on transversely opposite ends of the pivot joint.

3. The pivot joint as defined in claim 2, wherein the pair of said angled raceway surfaces of each of the inner and outer bearing surfaces are disposed between 90 and 180 degrees apart from each other.

4. The pivot joint as defined in claim 1, wherein the inner and outer bearing sleeves are each comprised of two halves transversely abutted end-to-end and meeting at a contact plane disposed at a transverse midpoint of the pivot joint, the contact plane being substantially perpendicular to the central pivot axis.

5. The pivot joint as defined in claim 1, wherein at least the inner bearing sleeve is comprised of a tubular component which axially extends the full transversal width thereof and a pair of opposed angular bearing portions which define the angled raceway surface thereon.

6. The pivot joint as defined in claim 1, wherein a first transversal width of the inner bearing sleeve is greater than a second transversal width of the outer bearing sleeve, the inner bearing sleeve bearing a major portion of the transversal load applied to the pivot joint.

7. The pivot joint as defined in claim 1, wherein the inner bearing sleeve has a radially projecting lip extending circumferentially about a perimeter of transverse ends of the inner bearing sleeve.

8. The pivot joint as defined in claim 7, wherein the radially projecting lip of the inner bearing sleeve extends radially beyond an outer circumferential perimeter of the outer bearing sleeve.

9. The pivot joint as defined in claim 1, wherein the angle between the angled raceway surface and the central pivot axis is between 0 and 90 degrees.

10. The pivot joint as defined in claim 9, wherein the angle is approximately 45 degrees.

11. The pivot joint as defined in claim 1, wherein at least one bolt is received though a bore defined in the inner bearing sleeve and extends fully transversely therethrough.

12. The pivot joint as defined in claim 1, wherein the inner bearing sleeve has a hardness and/or rigidity that is greater than that of the outer bearing sleeve.

13. The pivot joint as defined in claim 12, wherein the outer bearing sleeve is elastomeric.

14. The pivot joint as defined in claim 1, wherein both the inner bearing sleeve and the outer bearing sleeve define a generally channel-shaped cross-sectional profile.

15. A bicycle frame comprising a rear wheel suspension and at least one pivot joint pivotally interconnecting first and second bicycle components such as to permit relative rotation therebetween, at least one of the first and second bicycle components being a portion of the bicycle frame, the pivot joint being a plain-bearing free of rolling elements comprising two concentric bearing shells, the bearing shells including inner and outer bearing sleeves which are rotateable one within the other about a central pivot axis and which include respective bearing surfaces in sliding contact with each other, the outer bearing sleeve being in fixed abutment with the first bicycle component and the inner bearing sleeve being in fixed abutment with the second bicycle component, the inner bearing sleeve having first and second angular contact bearing portions which define angled outer bearing surfaces thereon and the outer bearing sleeve having second and third angular bearing portions defining angled inner bearing surfaces thereon, said angled outer and inner bearing surfaces abutting each other in bearing engagement and being disposed at an common angle relative to the central pivot axis to define an angled slip plane therebetween.

16. The bicycle frame as defined in claim 15, wherein each of the inner and outer bearing surfaces defines a pair of said angled raceways which face each other and are disposed on transversely opposite ends of the pivot joint.

17. The bicycle frame as defined in claim 15, wherein the inner and outer bearing sleeves are each comprised of two halves transversely abutted end-to-end and meeting at a contact plane disposed at a transverse midpoint of the pivot joint, the contact plane being substantially perpendicular to the central pivot axis.

18. The bicycle frame as defined in claim 15, wherein a first transversal width of the inner bearing sleeve is greater than a second transversal width of the outer bearing sleeve, the inner bearing sleeve bearing a major portion of the transversal load applied to the pivot joint.

19. The bicycle frame as defined in claim 15, wherein the inner bearing sleeve has a radially projecting lip extending circumferentially about a perimeter of transverse ends of the inner bearing sleeve.

20. The bicycle frame as defined in claim 19, wherein the radially projecting lip of the inner bearing sleeve extends radially beyond an outer circumferential perimeter of the outer bearing sleeve, such that the outer bearing sleeve is transversely spaced apart from the second frame component against which the inner bearing sleeve is in fixed abutment.

21. The bicycle frame as defined in claim 15, wherein the inner bearing sleeve has a hardness and/or rigidity that is greater than that of the outer bearing sleeve.

22. The bicycle frame as defined in claim 15, wherein both the inner bearing sleeve and the outer bearing sleeve define a generally channel-shaped cross-sectional profile.

23. A bicycle comprising a front wheel, a frame including a rear wheel suspension assembly supporting a rear wheel, and at least one pivot joint which provides relative rotation between two components of the bicycle, the pivot joint having an inner bearing sleeve concentrically disposed within an outer bearing sleeve and being rotatable relative thereto about a central pivot axis to permit relative rotation of the two components joined by the pivot joint, the outer bearing sleeve being in fixed abutment with a first one of the two components and the inner bearing sleeve being in fixed abutment with a second one of the two components, the inner bearing sleeve having an outer bearing surface in sliding contact with an inner bearing surface of the outer bearing sleeve, each of the outer and inner bearing surfaces having a substantially axially extending region and at least one angled bearing region defining an angled raceway thereon which is disposed at an angle relative to the central pivot axis, the angled raceways meeting in bearing engagement with each other.

24. The bicycle as defined in claim 23, wherein each of the inner and outer bearing surfaces defines a pair of said angled raceways which face each other and are disposed on transversely opposite ends of the pivot joint.

25. The bicycle as defined in claim 23, wherein the inner and outer bearing sleeves are each comprised of two halves transversely abutted end-to-end and meeting at a contact plane disposed at a transverse midpoint of the pivot joint, the contact plane being substantially perpendicular to the central pivot axis.

26. The bicycle as defined in claim 23, wherein a first transversal width of the inner bearing sleeve is greater than a second transversal width of the outer bearing sleeve, the inner bearing sleeve bearing a major portion of the transversal load applied to the pivot joint.

27. The bicycle as defined in claim 23, wherein the inner bearing sleeve has a radially projecting lip extending circumferentially about a perimeter of transverse ends of the inner bearing sleeve.

28. The bicycle as defined in claim 27, wherein the radially projecting lip of the inner bearing sleeve extends radially beyond an outer circumferential perimeter of the outer bearing sleeve, such that the outer bearing sleeve is transversely spaced apart from the second frame component against which the inner bearing sleeve is in fixed abutment.

29. The bicycle as defined in claim 23, wherein the inner bearing sleeve has a hardness and/or rigidity that is greater than that of the outer bearing sleeve.

30. The bicycle as defined in claim 23, wherein both the inner bearing sleeve and the outer bearing sleeve define a generally channel-shaped cross-sectional profile.

31. The bicycle as defined in claim 23, wherein said two components of the bicycle include first and second frame components which are pivotally interconnected by the pivot joint.

32. The bicycle as defined in claim 31, wherein the first and second frame components form part of the rear suspension assembly.

33. The bicycle as defined in claim 23, wherein at least one of the two components interconnected by the pivot point is a frame component.

34. The bicycle frame as defined in claim 15, wherein both of said first and second bicycle components are frame components which are pivotally interconnected by the pivot joint.

35. The bicycle frame as defined in claim 34, wherein the first and second frame components form part of the rear wheel suspension.

\* \* \* \* \*